US009733651B2

United States Patent
Grill et al.

(10) Patent No.: US 9,733,651 B2
(45) Date of Patent: Aug. 15, 2017

(54) PROPORTIONAL PRESSURE-REGULATING VALVE

(71) Applicant: HYDAC FLUIDTECHNIK GMBH, Sulzbach/Saar (DE)

(72) Inventors: Martin Grill, St. Wendel (DE); Peter Bruck, Althornbach (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 0 days.

(21) Appl. No.: 14/891,691

(22) PCT Filed: Apr. 8, 2014

(86) PCT No.: PCT/EP2014/000929
§ 371 (c)(1),
(2) Date: Nov. 17, 2015

(87) PCT Pub. No.: WO2014/187519
PCT Pub. Date: Nov. 27, 2014

(65) Prior Publication Data
US 2016/0109889 A1 Apr. 21, 2016

(30) Foreign Application Priority Data

May 24, 2013 (DE) .......................... 10 2013 008 840

(51) Int. Cl.
*F16K 11/07* (2006.01)
*G05D 16/20* (2006.01)

(52) U.S. Cl.
CPC ................. *G05D 16/2013* (2013.01)

(58) Field of Classification Search
CPC ............. G05D 16/2013; F15B 13/0402; F15B 13/0442; F15B 2013/0412; F16K 11/0716; Y10T 137/86702

(Continued)

(56) References Cited

U.S. PATENT DOCUMENTS 4,576,200 A * 3/1986 Janecke ............. G05D 16/2093
137/624.13
6,598,622 B1 * 7/2003 Reith .................. F15B 13/0402
137/625.63

(Continued)

FOREIGN PATENT DOCUMENTS

DE 199 49 756 4/2001
DE 101 50 238 9/2003
DE 10 2009 006 445 7/2010

OTHER PUBLICATIONS

International Search Report (ISR) issued Nov. 21, 2014 in International Application No. PCT/EP2014/000929.

*Primary Examiner* — Reinaldo Sanchez-Medina
(74) *Attorney, Agent, or Firm* — Wenderoth, Lind & Ponack, L.L.P.

(57) ABSTRACT

A proportional pressure-regulating valve (10) for actuating a first fluid connection (f1) from a working connection (A) to a tank connection (T) and a second fluid connection (f2) from a supply connection (P) to the working connection (A), includes a regulating piston (14) guided movably in a valve housing (12). The regulating piston opens the first fluid connection (f1) and closes the second fluid connection (f2) when in a first position, and closes the first fluid connection (f1) and opens the second fluid connection (f2) when a second position. The regulating piston (14) can be displaced from a first position into a third position when the first fluid connection (f1) is open by the total differential pressure produced when fluid flows through. When the regulating piston (14) is in the third position, the first fluid connection (f1) is opened with an enlarged opening cross section compared to the first position, and the second fluid connection (f2) remains closed.

14 Claims, 1 Drawing Sheet

(58) Field of Classification Search
USPC .................................... 137/625.68, 625.69
See application file for complete search history.

(56) References Cited

U.S. PATENT DOCUMENTS

| | | | |
|---|---|---|---|
| 8,662,109 B2* | 3/2014 | Bill .................... | F15B 13/0433 |
| | | | 137/625.64 |
| 2003/0070715 A1 | 4/2003 | Royle | |
| 2008/0087345 A1* | 4/2008 | Tabor .................. | F15B 13/0402 |
| | | | 137/625.65 |
| 2011/0297856 A1 | 12/2011 | Bill et al. | |

* cited by examiner

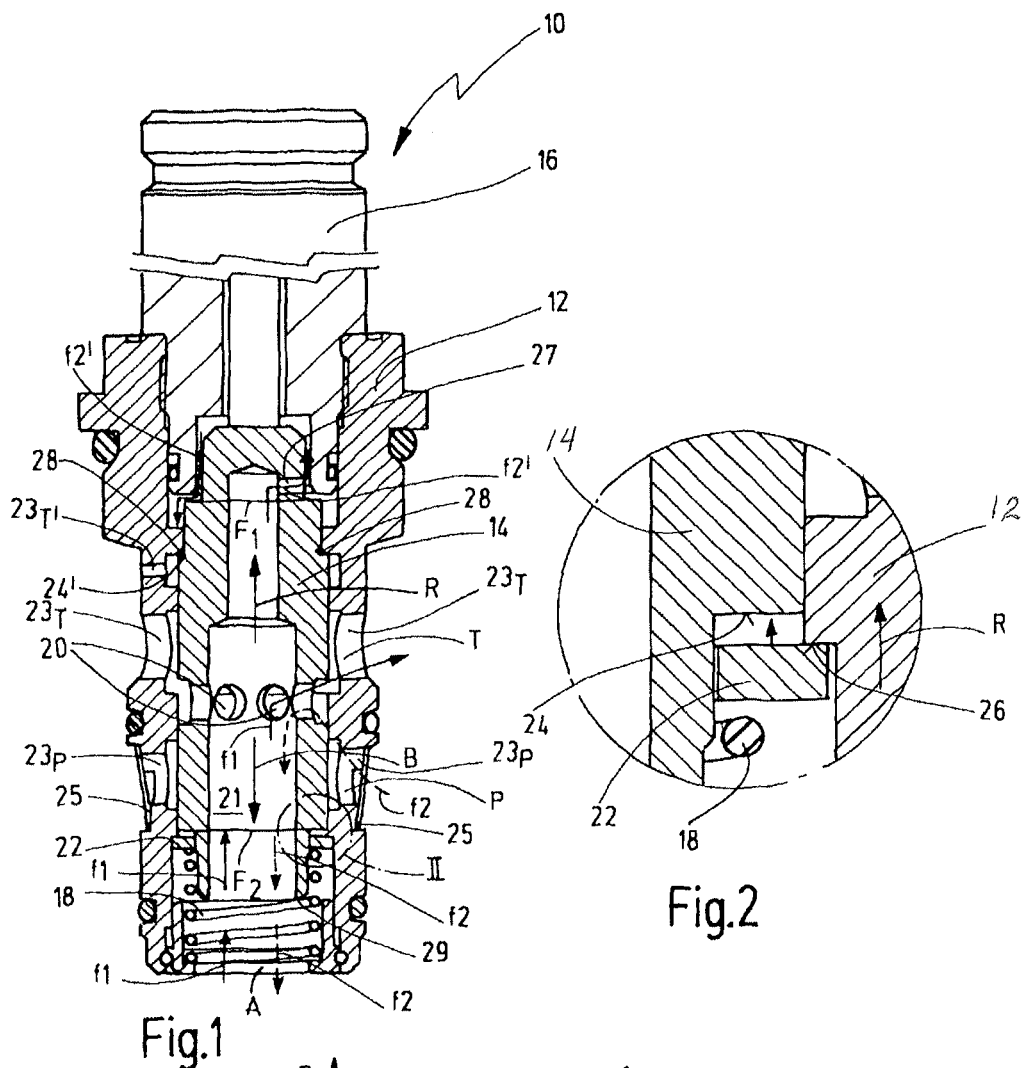
Fig.1
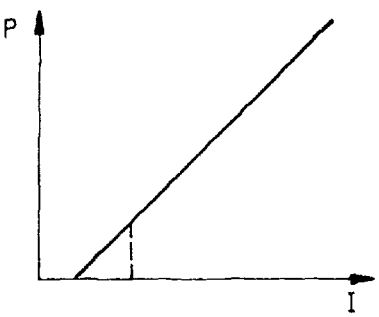
Fig.2
Fig.3

PROPORTIONAL PRESSURE-REGULATING VALVE

FIELD OF THE INVENTION

The invention relates to a proportional pressure-regulating valve for controlling a first fluid connection from a working connection to a tank connection and a second fluid connection from a supply connection to the working connection. The valve comprises a valve housing having a working connection, a tank connection and a supply connection. A regulating piston is guided displaceably in the valve housing, opens the first fluid connection from the working connection to the tank connection and closes the second fluid connection from the supply connection to the working connection when a first position, and closes the first fluid connection and opens the second fluid connection when in a second position. A restoring device holds the regulating piston in the direction of the first position. An actuating device displaces the regulating piston against the restoring force of the restoring device in the direction of the second position.

BACKGROUND OF THE INVENTION

Proportional pressure-regulating valves are used, for example, in mobile working machines for the electrohydraulic controlling of clutches. When actuated or engaged, these clutches are initially pressurized with fluid pressure until the respective clutch disk reaches or contacts the respectively associated contact surface. The clutch pressure required to overcome the spring forces assumes comparatively small values below 2 bar. An additional increase in the clutch pressure results in the kind of forces on the clutch disks or clutch linings that then enable a torque to be transmitted by friction.

In the case of directly controlled proportional pressure-regulating valves, magnets having large working strokes are used to open or release a maximally large flow cross section as an opening cross section for the respective fluid connection. If these large and comparatively cost-intensive magnets were to be replaced by smaller cost-effective magnets as actuating devices with equal force, the linear power-stroke range would have to be shortened accordingly. Otherwise, this replacement would inevitably mean that when actuating the actuation device, such as when energizing an electromagnet, to open the second fluid connection from the supply connection to the working connection, a large spring force or restoring force would have to be initially overcome, and that the linear P-I characteristic curve of the proportional pressure-regulating valve would be achieved in a kind of "jump start" when the spring force or restoring force is exceeded as a result of the magnetic force. This situation could result in a "jerky", delayed start-up of the working machine, which is undesirable for the working machine in mobile applications.

SUMMARY OF THE INVENTION

An object of the invention is to provide an improved proportional pressure-regulating valve for electrohydraulic controlling of a clutch, such that magnets having a shortened linear power-stroke range may be used and an irregular, in particular a sudden, start-up behavior may be avoided, thereby improving the valve function.

This object is basically achieved by a proportional pressure-regulating valve according to the invention being distinguished by the fact that, when opening the first fluid connection, the regulating piston is displaceable from the respective first position to at least one additional third position as a result of the overall differential pressure present at the regulating piston. Also, in this respective third position of the regulating piston, the first fluid connection having an enlarged opening cross section compared to the respective first position is opened and the second fluid connection remains closed. According to the invention, a respective third position of the regulating piston, which increases a fluid flow to the tank connection or enlarges the first fluid connection, is attainable by also using the differential pressure that occurs during a flow to or flow through the proportional pressure-regulating valve, more precisely the regulating piston, from the working connection to the tank connection to move the regulating piston. Through the respective third position, a kind of rapid discharge function for a hydraulic consumer, such as a clutch, connected to the working connection is implemented in a proportional pressure-regulating valve according to the invention.

The differential pressure expediently engages a piston surface of the regulating piston, which piston surface is arranged rearward and faces the actuating magnet. Thus, the regulating piston is moved from a first position to a respective third position by a restoring force applied by the restoring device, while including the fluid differential pressure present at the regulating piston.

In one preferred embodiment of the proportional pressure-regulating valve according to the invention, the regulating piston is tubular, preferably in the shape of a tubular cylinder, is constructed with an internal space and includes fluid passages for the respective fluid connections passing through the internal space. At least one passage associated with the respective connection is constructed in the valve housing in each case. Each of the passages associated with the supply connection and the tank connection is, depending on the position of the regulating piston in the valve housing, fluidically connected through the corresponding fluid passages to the internal space, or separated therefrom in a fluid-impermeable manner, depending on the respective regulating position of the regulating piston.

As normally constructed, the fluid passages associated with the supply connection and the tank connection are preferably regularly formed and arranged in a longitudinal section of the regulating piston. In the respective first position of the regulating piston, the fluid passages are arranged in relation to the valve housing in such a way that the first fluid connection from the working connection through the internal space, through the attributable fluid passages and the attributable passage in the valve housing to the tank connection is opened. Thus, in at least one of the first positions of the regulating piston, the at least one passage in the valve housing associated with the supply connection is separated in a fluid-impermeable manner from the internal space of the regulating piston, and thus, the second fluid connection to the pressure supply is closed. Correspondingly, in at least one of the second positions of the regulating piston, the first fluid connection to the tank is closed and the second fluid connection to the pressure supply is opened.

The fluid passage in the regulating piston associated with the working connection and the corresponding passage in the valve housing are advantageously arranged on an underside of the proportional pressure-regulating valve. This configuration results in the advantage of a particularly compact construction of the proportional pressure-regulating valve. The actuating device is expediently arranged on an upper side of the proportional pressure-regulating valve opposite the working connection.

When actuating the actuating device of the proportional pressure-regulating valve, for example, by energizing an electromagnet, the regulating piston is displaced from the respective first position to a respective second position. When switching off the actuating device, on the other hand, the regulating piston is displaced back to the respective first position, inter alia, by the restoring force applied by the restoring device. The restoring device may be a spring element, in particular a compression spring surrounding the regulating piston. The actuating device comprises, for example, an electromagnet having a linear power-stroke range. In addition, the regulating piston, depending on the fluid pressure present at the piston, is engaged by a differential pressure, which results from the varying surface formation on the graduated regulating piston. Thus, an annular differential pressure surface is provided on the outer circumference of the graduated piston, the pressure activity of which results from the difference between the largest outer circumference of the regulating piston in the region of the working connection and an average outer circumference in the rearward region of the regulating piston facing the actuating device. The differential pressure area between these two aforementioned outer diameters, which delimit corresponding surface areas, is implemented as a further gradation of the regulating piston.

If, according to the invention, the regulating piston is displaced to one of its third positions, the opening cross section for the first fluid connection becomes larger than in its respective third position. This arrangement has the advantage that, when switching off, in other words, when terminating the actuation of the actuating device, the fluid pressure through the appropriately occupied respective third position and the opening cross section enlarged in this manner may be guided in a kind of rapid discharge function of the proportional pressure-regulating piston according to the invention from the working connection back to the tank connection.

It is further advantageous that the restoring device engages the regulating piston via an intermediate element, that the intermediate element abuts the regulating piston in the respective first position of the regulating piston, and that the regulating piston in its respective third position is spaced apart from the intermediate element. The intermediate element preferably encompasses the regulating piston at least partially and/or is annular, particularly preferably disk-shaped. A preferably annular piston stop may be formed on the regulating piston. A preferably annular housing stop for the intermediate element may be formed on the valve housing.

Once the appropriate amount of fluid is recirculated from the working connection to the tank connection, the pressure difference and, correspondingly, the effective pressurization of the regulating piston drops to zero. The regulating piston at this point is in an indifferent state. From that state, with a small actuation force it may be guided back to the respective first position, i.e., in abutment with the intermediate element, during renewed actuation or switching on of the actuating device, typically in the form of an electromagnet. Once abutment, i.e., contact with the intermediate element and consequently with the restoring device is achieved, the actuating device, such as the electromagnet, is in the respective linear range and the corresponding P-I characteristic curve may be traversed from the start. As a result, any sudden irregularity caused by the clutch device during start-up of a working machine or vehicle may be avoided. Ultimately, according to the invention, the use of a cost-effective magnet having a small linear stroke range is possible without restriction, if an additional movement of the regulating piston from the first to at least one additional third position is made possible by fluid pressure, more precisely, by the required differential pressure.

The invention further comprises a valve assembly having a proportional pressure-regulating valve according to the invention and a hydraulic consumer, such as a clutch, connected to the working connection of the proportional pressure-regulating valve.

The aforementioned and the additionally cited features may be implemented according to the invention in each case individually or in arbitrary combinations with one another.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that are schematic and not to scale:

FIG. 1 is a side view partially in section of a proportional pressure-regulating valve according to an exemplary embodiment of the invention;

FIG. 2 is an enlarged detail II from FIG. 1; and

FIG. 3 is a P-I characteristic curve for a proportional pressure-regulating valve according to the invention compared to a conventional solution.

DETAILED DESCRIPTION OF THE INVENTION

FIG. 1 shows a partial section of an elongated, largely cylindrical proportional pressure-regulating valve 10. Valve 10 includes a valve housing 12, a regulating piston 14, which is linearly displaceable in the valve housing 12, and three fluid connections, a first fluid connection designed as a tank connection T, a second fluid connection designed as a supply connection P, and a third fluid connection designed as a working connection A. An actuating movement B of the regulating piston 14 is caused by an actuating device 16 comprising an electromagnet capable of being energized. During the actuating movement B, a restoring device 18, designed as a compression spring, on the end of the valve housing 2 associated with the working connection A opposite the actuating device 18, is at least partially compressed. In other words, an actuating movement B of the regulating piston 14 requires overcoming a restoring force applied by the restoring device 18. If the actuating device 16 engaging the regulating piston 14 is no longer actuated, for example, the electromagnet is no longer energized, the regulating piston 14 is returned to its original position in accordance with a restoring movement R caused by the restoring device 18 and counter to the actuating movement B.

Depending on the state, in other words placement or position, of the regulating piston 14 in the valve housing 12, a first fluid connection f1 from the working connection A to the tank connection T or a second fluid connection f2 from the supply connection P to the working connection A is at least partially opened or closed. For this purpose, fluid passages 20 are provided in a longitudinal section of the tubular regulating piston 14 which, in accordance with the state of the regulating piston 14, open the respective fluid connection f1, f2. From the working connection A, the first fluid connection f1 leads through an internal space 21 of the regulating piston 14 and through the fluid passages 20 to a tank connection T, comprising at least one passage $23_T$ in the valve housing 12. The second fluid path f2 leads from a supply connection P, comprising at least one passage $23_P$ in the valve housing 12, through the fluid passages 20 and the internal space 21 of the regulating piston 14 to the working connection A, if the regulating piston 14, as seen in the direction of FIG. 1, moves by a displacing movement downward against the action of the compression spring 18, whereupon the previously existing fluid path f1 according to the depiction in FIG. 1 is then closed.

The restoring device 18 does not directly engage the regulating piston 14. Rather, a disk-like intermediate element 22 surrounds or encompasses the regulating piston 14 and is able to move synchronously with the piston 14. A piston stop 26 is provided on the regulating piston 14 for transmitting the restoring force from the intermediate element 22 to the regulating piston 14, as depicted in FIG. 2 magnified in a size ratio of 10:1. The piston stop 26, like a comparable housing stop 24, is formed as an annular surface on the valve housing 12. In FIG. 2, an arrow indicates that the restoring device 18 causes a corresponding movement of the intermediate element 22, and that the restoring movement R of the regulating piston 14 is caused indirectly as a result of the intermediate element 22 abutting the piston stop 26.

In the arrangement shown in FIG. 2, the regulating piston 14 is situated above one of its second potential positions, into which the former has been guided in an actuating movement B caused by the actuating device 16. In accordance with the spacing shown in FIG. 2 between the intermediate element 22 and the housing stop 24, the second fluid connection f2, delineated by dashed lines in FIG. 1, from the supply connection P to the working connection A is at least partially opened. The second position corresponds to the filling of a hydraulic consumer connected at the working connection A with fluid from supply connection P. A bore 27 is formed in the regulating piston 14, exiting in the radial direction from the internal space 21 at the end of the regulating piston 14 opposite the working connection A. An additional passage $23_T{'}$ associated with the tank connection T is also formed in the valve housing 12. An additional second fluid connection f2' in the position shown in FIG. 1 leads from the working connection A through the internal space 21 and the bore 27 of the regulating piston 14 to the rear side thereof and in the process arrives at an annular surface 28 formed in gradations in the regulating piston. This connection f2' allows for a leakage connection with the tank pressure at the point $23_T{'}$ and moreover forms a stop for the upper regulating position of the regulating piston 14 as a result of the annular surface 28 interacting in this region with a corresponding projection on the inside of the valve housing 12. The fluid pressure on the rear part of the regulating piston 14 is registered via the above described fluid path, and the leakage flows during operation of the valve-like regulating piston 14 can be discharged through the fluid connection f2' to the tank connection in the form of the passage $23_T{'}$ toward the tank side T. Sieve elements 25, which retain any impurities from the fluid emanating from the pressure supply side P flowing into the second fluid connection f2 in the proportional pressure-regulating valve 10, may be arranged in the region of the passages $23_P$ associated with the supply connection P.

To "discharge" the hydraulic consumer, the energizing of the actuating device 16 designed as an electromagnet, is discontinued. The regulating piston 14 is then moved from the second position back to the first position in accordance with the restoring movement R. In this first position of the regulating piston 14, the intermediate element 22 abuts the housing stop 24, the first fluid connection f1 from the working connection A to the tank connection T is again opened, and the second fluid connection f2 is closed. During the restoring movement R, the restoring device 18 engages the piston stop 26 of the regulating piston 14 via the intermediate element 22.

In the proportional pressure-regulating valve 10, a third regulating position enlarging a fluid passage to the tank connection T or respectively the first fluid connection f1 is implemented according to the invention. The differential pressure that occurs when fluid flows through the proportional pressure-regulating valve 10, more precisely the regulating piston 14, from the working connection A to the tank connection T also acts on the regulating piston 14. The actively pressured surface that also serves to actuate the regulating piston is formed from the difference between the surfaces $F_2$ and $F_1$ according to the depiction of FIG. 1. This difference corresponds to the size of the sector or differential surface 28. The surface $F_2$ in this case corresponds to the largest outer diameter or largest cross sectional surface of the regulating piston 14 in the region of its free front end, which may be abutted by the intermediate element 22. In contrast, the additional surface $F_1$ is the cross sectional surface of the regulating piston 14 in its rearward region reduced by the differential surface 28. The corresponding differential pressure or fluid pressure is available when recirculating fluid from the working connection A back to the tank connection T, for example, when disengaging a clutch associated with the proportional pressure-regulating valve 10. The respective third state or position of the regulating piston 14 is referred to as a "range-extender" in accordance with the stroke increase. In a third position of the proportional pressure-regulating valve 10, an enlarged opening cross section for the first fluid connection f1 is opened to empty a hydraulic consumer connected to the working connection A, for example, when releasing a clutch. This enables a rapid discharge function of the hydraulic consumer, for example, a rapid separation of the clutch. The maximal third position for the regulating piston 14 is set via an additional housing stop 24', which is formed as an annular surface on the valve housing 12, as shown in FIG. 1.

Once the emptying or discharging of the working connection A to the tank connection T is completed, the differential pressure is eliminated, and thus, the force effect on the circular ring surface 29 on the regulating piston 14 which, as a result, is in an indifferent state. FIG. 3 shows a P-I characteristic curve for the proportional pressure-regulating valve 10 shown in FIGS. 1 and 2. When further actuating the actuating device 16, such as energizing the electromagnet, the regulating piston 14 is initially guided from the indifferent state back to the respective first position, in other words, in contact with the intermediate element 22. A small force of the actuating device 16, designed as an electromagnet, is sufficient to move the regulating piston 14 back into contact or abutment with the intermediate element 22 formed as an annular disk. Once contact with the intermediate element 22, and thus with the restoring device 18 designed as a spring element is achieved, the actuating device 16 is situated in its linear range and the P-I characteristic curve may be traversed without jump start, as delineated in FIG. 3 by dashed lines for known solutions. The fluid pressure p guided via the second fluid connection f2 from the supply connection P to the working connection A increases linearly with the actuating current I for the actuating device 16 designed as an electromagnet.

While one embodiment has been chosen to illustrate the invention, it will be understood by those skilled in the art that various changes and modifications can be made therein without departing from the scope of the invention as defined in the claims.

The invention claimed is:

1. A proportional pressure-regulating valve, comprising:
a valve housing having a working connection, a tank connection and a supply connection;
a regulating piston guided displaceably in said valve housing opening a first fluid connection from said working connection to said tank connection and closing a second fluid connection from said supply connection to said working connection when said regulating piston is in a first position, said regulating piston closing said first fluid connection and opening said second fluid connection in a second position of said regulating piston, said regulating piston being displaceable from the first position to a third position by a total differential pressure produced when fluid flows through said valve housing, said first fluid connection being opened with an enlarged cross section in the third position than in the first position while said second fluid connection remains closed;
a restoring device holding said regulating piston in a direction of the first position;
an actuating device displacing said regulating piston against a restoring force of said restoring device in a direction of the second position; and
an intermediate element engaging and connecting the restoring device with said regulating piston, said intermediate element abutting said regulating piston in the first position of the regulating piston and being spaced apart from said regulating piston in the third position of said regulating piston.

2. A proportional pressure-regulating valve according to claim 1 wherein
said regulating piston is tubular and has an internal space and piston fluid passages forming said first and second fluid connections leading through to said internal space; and
said housing comprises therein a housing passage for each of said working connection, said supply connection and said tank connection, said housing passages associated with said supply connection and said tank connection being in a fluid communication through corresponding ones of said piston fluid passages as a function of states of said regulating piston in said valve housing.

3. A proportional pressure-regulating valve according to claim 2 wherein
the respective piston fluid passage associated with said working connection and the corresponding housing passage are arranged on an underside of the proportional pressure regulating valve.

4. The proportional pressure-regulating valve according to claim 1 wherein
a differential pressure is present when fluid flows through said regulating piston at said regulating piston resulting from a different surface formation by said regulating piston being graduated;
an outer circumference of said regulating piston having an annular differential pressure surface, a pressure effect resulting from a difference between a largest outer circumference of the regulating piston in a region of said working connection and an average outer circumference in a rearward region of said regulating piston facing said actuating device; and
said annular differential surface being between said largest and average outer circumferences is an additional gradation of said regulating piston.

5. A proportional pressure-regulating valve according to claim 1 wherein
said intermediate element at least partially encompasses said regulating piston in all positions of said regulating piston.

6. A proportional pressure-regulating valve according to claim 5 wherein
said intermediate element is annular.

7. A proportional pressure-regulating valve according to claim 6 wherein
said intermediate element is disk-shaped.

8. A proportional pressure-regulating valve according to claim 1 wherein
a piston stop is on said regulating piston; and
a housing stop for said intermediate element is on said housing.

9. A proportional pressure-regulating valve according to claim 8 wherein
each of said piston stop and said housing stop are annular.

10. A proportional pressure-regulating valve according to claim 1 wherein
said restoring device comprises a spring element.

11. A proportional pressure-regulating valve according to claim 10 wherein
said spring element is a compression spring encompassing said regulating piston.

12. A proportional pressure-regulating valve according to claim 1 wherein
said actuating device comprises an electromagnet having a linear power stroke range.

13. A proportional pressure-regulating valve according to claim 1 wherein
a hydraulic consumer is connected fluid communication to said working connection.

14. A proportional pressure-regulating valve according to claim 13 wherein
said hydraulic consumer comprises a clutch.

* * * * *